(Model.)
E. L. HOWE.
Chain.
No. 240,133.                    Patented April 12, 1881.
Fig. 1.
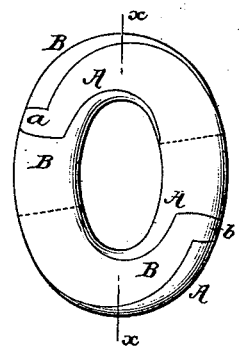
Fig. 2.
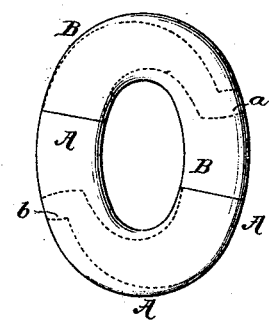
Fig. 3.                    Fig. 4.
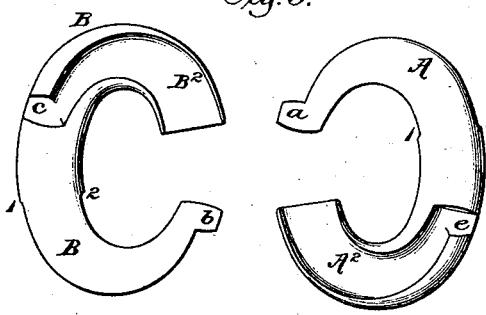 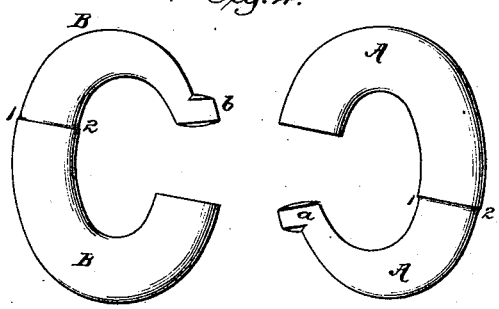
Fig. 5.          Fig. 6.          Fig. 7.
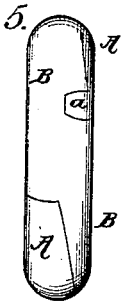 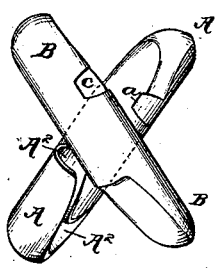 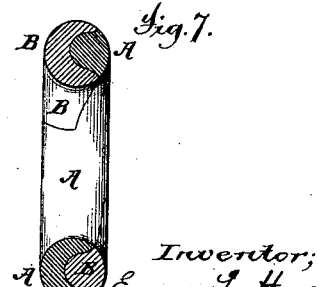
Witnesses:
G. M. Graham
Jacob Felbel
Inventor;
Eugene L. Howe
By
J. Mac Pieter
Atty.

UNITED STATES PATENT OFFICE.

EUGENE L. HOWE, OF CHICAGO, ILLINOIS.

CHAIN.

SPECIFICATION forming part of Letters Patent No. 240,133, dated April 12, 1881.

Application filed February 17, 1881. (Model.)

*To all whom it may concern:*

Be it known that I, EUGENE L. HOWE, of Chicago, in the county of Cook and State of Illinois, have invented certain new and useful Improvements in Chains; and I do hereby declare that the following is a full and exact description of the invention, reference being had to the accompanying drawings, making part of this specification.

My invention relates to a novel construction of the links of chain-cables, and has for its main object to produce a link composed of two parts, which shall be duplicates, and adapted to interlock with each other in such manner that the link composed of them shall possess the same capacity to endure the draft-strain as a solid link, while at the same time the said link may be designedly taken apart conveniently to separate the parts of a chain composed of such links for the well-known purposes.

To this main end and object my invention consists of a link composed of duplicate parts, each of which is embedded in the other for some distance at each of the localities at which the link is designed to be coupled to another link, but in such manner that the incasing and the incased portions of each part shall be located at opposite faces of the link, all as will be hereinafter explained.

To enable those skilled in the art to make and use a chain-link embracing my invention, I will now proceed to more fully describe the construction and operation of the same, referring by letters to the accompanying drawings, making part of this specification, and in which—

Figure 1 is a face view of a link made according to my invention. Fig. 2 is a similar view of the opposite face of the link; Fig. 3, a view showing the faces of the parts of the link separated, and with those faces uppermost which are so shown at Fig. 1, while Fig. 4 is a similar view, but with those faces of the parts uppermost which are so shown at Fig. 2. At Fig. 5 is seen an edge view of the link. Fig. 6 is a view looking at the same edge of the link and showing its parts turned into a relative position, in which they may be readily moved away from each other. Fig. 7 is a longitudinal section at $x$ $x$, Fig. 1, with the link viewed in the same position that it is seen in at Fig. 5.

In the several figures the same part will be found designated by the same letter of reference.

The link is shown as being, by preference, about elliptical or oval in contour, and as being about circular and of the same size, in cross-section, at every part. It is composed of two parts, A and B, which, as clearly shown by the drawings, are perfect duplicates of each other. Each part is C-shaped in contour— that is, has the continuity of its elliptical contour broken for a short distance at one of the sides of the oval; and each part has one end portion made thicker than the other, with such thicker portion hollowed out for the reception, in a manner to be presently explained, of the thinner portion of its mate or duplicate part. The conformation or structure of these duplicate parts, or of either of them, will be best comprehended by an inspection of the drawings, wherein it will be seen that the part A, for instance, has its larger or wider end portion hollowed out at $A^2$, (see Figs. 3, 6, and 7,) with a depression, $A^2$, terminating (at one side of the link part A) in a depression, $e$, running in a direction about transverse to the curved line of the side of part A; and wherein it will also be seen that the other and smaller end portion of part A is so shaped and provided with a foot-like lateral projection, $a$, as to be adapted to fit into the hollowed-out portion $B^2$ $c$ of the other or duplicate part, B, of the link.

By reference to the drawings, particularly to Figs. 1, 3, 5, 6, and 7, it will be plainly seen that the foot-like projections $a$ and $b$ of the two parts A and B of the link fit into the depressions at $c$ and $e$, and that by the engagement of these portions in the manner shown a positive interlocking of the parts is accomplished, (at the localities of the embedded projections $a$ and $b$,) to act as a bar against, or effectual impediment to, any relative movement of the parts A and B endwise of the link or in the line of the draft-strain on the chain, while at the same time the interlocking or engagement together of the partially incasing and embedded end portions of the parts A and B in the manner shown (see particularly Fig. 5, 6, and 7) also operates to effect a perfect retention together of the parts while the chain may be under tension, since the partial encircling of and pull on these interlocked end portions by the links coupled to the parts A B operate, of course, to hold said parts together in the condition represented in Figs. 1, 2, 5, and 7.

The parts composing the link, though incapable of separation while in a working condition in a chain, may be easily separated when the chain is slack by turning them relatively in the manner and directions illustrated at Fig. 6, and when so separated from each other may be each easily disconnected or disengaged from the other chain-links with which the link composed of the parts A B may be coupled.

In practicing my invention so far I have made the parts A B of malleable cast-iron, and of about the pattern and size shown; but the novel features of construction and operation of the chain-link constituting the subject-matter of my invention and of this application may, of course, be carried out in chain-links of various sizes and shapes made of any other suitable material.

The parts of the link being perfect duplicates, the manufacture of chain of such links (especially where made of cast metal) is simple and economic, and the chain is very desirable to the users, since any part of the link will go together with the part of any other link to make a complete link.

It will be observed that each part A and B has the stock left the full size and unimpaired in strength for some distance at that side of the part opposite to the cut-out that gives the part its C shape, and that, therefore, the tensile strength of a link composed of the parts A B is precisely the same at the middle portion of each side of the link as if the latter were made of one solid piece of the same cross-sectional area; but this and other features of structure seen are also to be found in the link made the subject of another application by me, in which I have set up a claim different from and somewhat broader than that set up in this application.

Having now so fully explained the nature of my invention and the construction and operation of my improved two-part link, that any ordinarily-skilled person can understand the former and make and use the latter, what I claim as new, and desire to secure by Letters Patent, is—

A chain-link composed of duplicate parts, each of which has an end portion that is provided with a recess or depression, and a solid end portion which is adapted to be embedded in such a depression, the said parts being adapted to engage with each other and capable of designed separation from each other and from other chain-links, substantially as hereinbefore set forth.

In witness whereof I have hereunto set my hand this 8th day of November, 1880.

EUGENE L. HOWE.

In presence of—
WILLIAM D. EWART,
C. R. MATSON.